United States Patent [19]
Bogani et al.

[11] Patent Number: 5,569,909
[45] Date of Patent: Oct. 29, 1996

[54] FORMAT RECOGNITION DEVICE FOR A FILM CASSETTE

[75] Inventors: Carlo Bogani, Bovisio; Maria-Teresa Rubbi, Piacenza, both of Italy

[73] Assignee: Siemens Aktiengesellschaft, Munich, Germany

[21] Appl. No.: 590,047

[22] Filed: Jan. 3, 1996

Related U.S. Application Data

[63] Continuation of Ser. No. 303,737, Sep. 9, 1994, abandoned.

[30] Foreign Application Priority Data

Sep. 23, 1993 [DE] Germany ............................ 43 32 428.2

[51] Int. Cl.[6] ........................................................ G01J 1/42
[52] U.S. Cl. ............................ 250/208.2; 250/559.24; 250/559.36; 378/167
[58] Field of Search .................................... 250/559, 561, 250/571, 208.2, 559.19, 559.24, 559.36; 378/172, 173, 174, 177, 178, 179, 180, 181, 167; 356/429, 375

[56] References Cited

U.S. PATENT DOCUMENTS

| | | | |
|---|---|---|---|
| 3,968,365 | 7/1976 | Sohngen | 250/338 |
| 4,070,582 | 1/1978 | Kisrow. | |
| 4,166,949 | 9/1979 | Pöld et al.. | |
| 4,416,020 | 11/1983 | Wagner et al. | 378/181 |
| 4,577,452 | 3/1986 | Hösel et al.. | |
| 4,894,854 | 1/1990 | Guba et al. | 378/181 |
| 5,320,340 | 4/1994 | Bay | 271/225 |
| 5,410,157 | 4/1995 | Davis | 250/560 |
| 5,500,725 | 3/1996 | Takasu et al. | 355/311 |

FOREIGN PATENT DOCUMENTS 0220832  5/1987  European Pat. Off..

*Primary Examiner*—Edward P. Westin
*Assistant Examiner*—Stephen Calogero
*Attorney, Agent, or Firm*—Hill, Steadman & Simpson

[57] ABSTRACT

In a device for recognizing the format of a film cassette for use in a film cassette holder, such as in an x-ray examination apparatus, a radiation receiver is disposed at a location at which radiation incident on the receiver is altered by a corner of the film cassette when the film cassette is inserted. The radiation receiver generates an output signal dependent on the radiation incident thereon, which is supplied to a processor which identifies the format of the film cassette whose corner caused the alteration in the incident radiation. Dependent on the format configuration, the alteration in the radiation may either be an occlusion of the radiation, or a signal indicating an absence of occlusion. The radiation may simply be ambient light, or may be radiation transmitted by a radiation transmitter allocated to the radiation receiver.

11 Claims, 4 Drawing Sheets

FORMAT RECOGNITION DEVICE FOR A FILM CASSETTE

This is a continuation of application Ser. No. 08/303,737, filed Sep. 9, 1994, now abandoned.

BACKGROUND OF THE INVENTION

1. Field of the Invention

The invention is directed to a format recognition device for a film cassette, particularly an x-ray film cassette, whereby the format of the film cassette is electro-optically detected by means of at least one radiation receiver.

2. Description of the Prior Art

X-ray film cassettes are employed in x-ray diagnostics installations for producing x-ray exposures of a subject. It is known to detect the format and the size of the film cassette by electromechanical means. Electromechanical means, however, are complicated to manufacture and thus are expensive; they are also subject to wear.

German PS 32 32 148 discloses that the format and the size of the film cassette be detected by means of a light barrier arrangement. The light barriers are rotatably mounted at a location in the cassette holder at which measurement of a set length or width is made as film cassette is inserted in the holder. A gap is presenting the light barrier at a position allocated to the format based on the length and on the width of the film cassette, so that the format can be recognized on the basis of the signal caused by the light passing through the gap of the light barrier.

European Application 0 202 832 discloses a method and an apparatus for sorting articles, particularly tableware, whereby an occlusion of photoelectric cells, and thus recognition of an article, ensues on the basis of the length and width, i.e. on the contour of the tableware.

German OS 28 37 112 discloses an apparatus for the automatic identification and registration of bottles having different sizes and/or shapes. The identification of the bottles ensues on the basis of individual occlusion patterns that are stored in a memory.

SUMMARY OF THE INVENTION

An object of the present invention is to implement a format recognition device for a film cassette operating on the principle of occlusion radiation from a radiation source, which can be economically manufactured.

This object is achieved in accordance with the principles of the present invention in a format recognition device wherein at least one corner region of the film cassette is utilized in combination with at least one radiation receiver for detecting the format.

An advantage of the invention is that the electro-optical sensing of the film cassette can be realized in a simple and economic way; it is also not subject to any significant wear.

It is advantageous when each format to be detected has at least one radiation receiver allocated to it since, for example, the upright side or broad side of a film cassette can thus be detected.

When film cassettes having different format sizes are to be detected, it is advantageous to provide at least one radiation receiver respectively for different format sizes.

It has proven advantageous for achieving a compact structure of the format recognition device when at least one corner region of the film cassette is utilized in combination with at least one radiation receiver for detecting the format. The radiation receivers can thus be arranged relatively close to one another. This is particularly advantageous when different format sizes are to be detected.

In a preferred development of the format recognition device, the radiation receiver has a radiation transmitter, whose light it receives, uniquely allocated to it. It is advantageous when the radiation receiver and the radiation transmitter are thereby arranged neighboring one another and when the light emanating from the radiation transmitter is directed onto the radiation receiver via a reflector. The radiation receiver and the radiation transmitter can thus be advantageously arranged on a board that is located at a first side of a film cassette carrier. The film cassette carrier has openings allocated to the radiation receiver and to the radiation transmitter, and the film cassette is arranged between the second side of the film cassette carrier and a reflector for detecting the format. The format is then advantageously detected on the basis of the occlusion of the radiation receiver by the film cassette. A structure of the format recognition device that is not susceptible to external disturbing influences is thus achieved.

DESCRIPTION OF THE PREFERRED EMBODIMENTS

Figure 1:
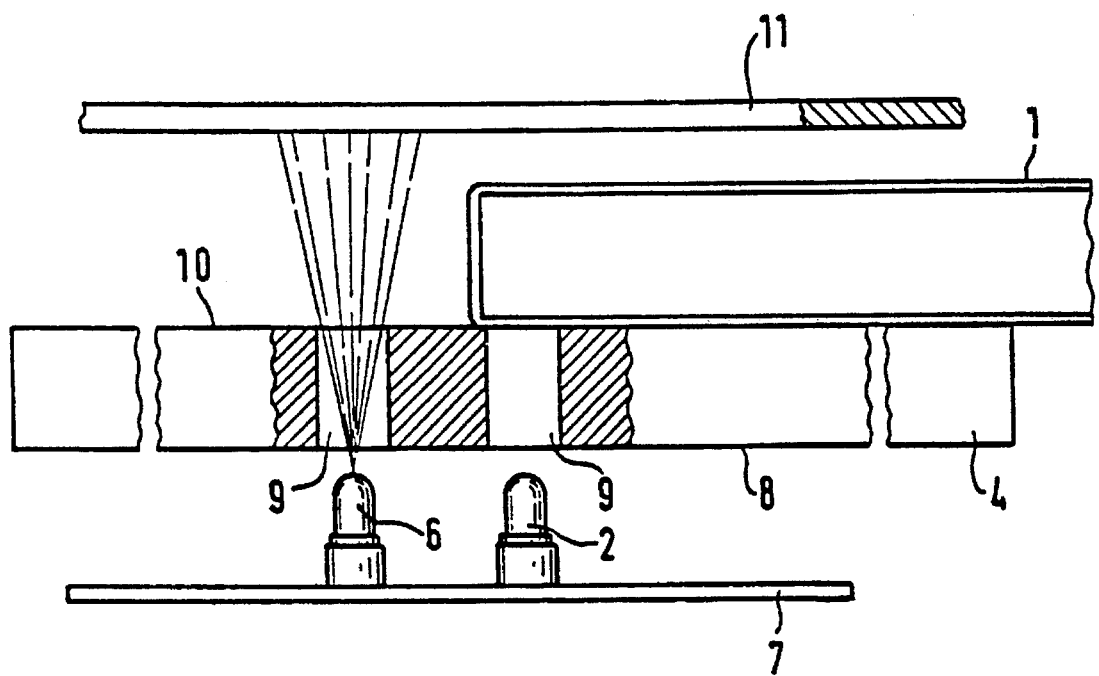
FIG. 1 is an exemplary embodiment of a format recognition device, shown schematically in a side view.

Identical elements in the format recognition device shown in FIGS. 1 through 4 are provided with the same reference characters.

According to the invention, the format of a film cassette 1 is electro-optically detected by at least one radiation receiver 2. If the format recognition device is intended to detect whether an upright or broad side format is selected given a format size of, for example, 13 ×18, then a single radiation receiver 2 whose signal is evaluated suffices. An occlusion of the radiation receiver 2 by the film cassette 1 can thereby denote, for example, that an upright format has been selected. The same conclusion, of course, can also be made if a radiation receiver 2 is allocated to the broad side format, this receiver then not being occluded by the film cassette 1 given an upright format. At least one radiation receiver 2, however, is preferably allocated to each format to be detected. When different format sizes, for example 13×18, 18×24, etc. are to be detected, it is advantageous when at least one radiation receiver 2 is respectively provided for each different format size. In a preferred development, the format of the film cassette 1 is detected on the basis of an occlusion of the radiation receiver 2 allocated to the corresponding format of the film cassette 1 by a corner region 3 of the film cassette 1. This corner region 3 is shown as an example in FIG. 2 with reference to the example of a film cassette 1 having the format 13×18.

Figure 2:
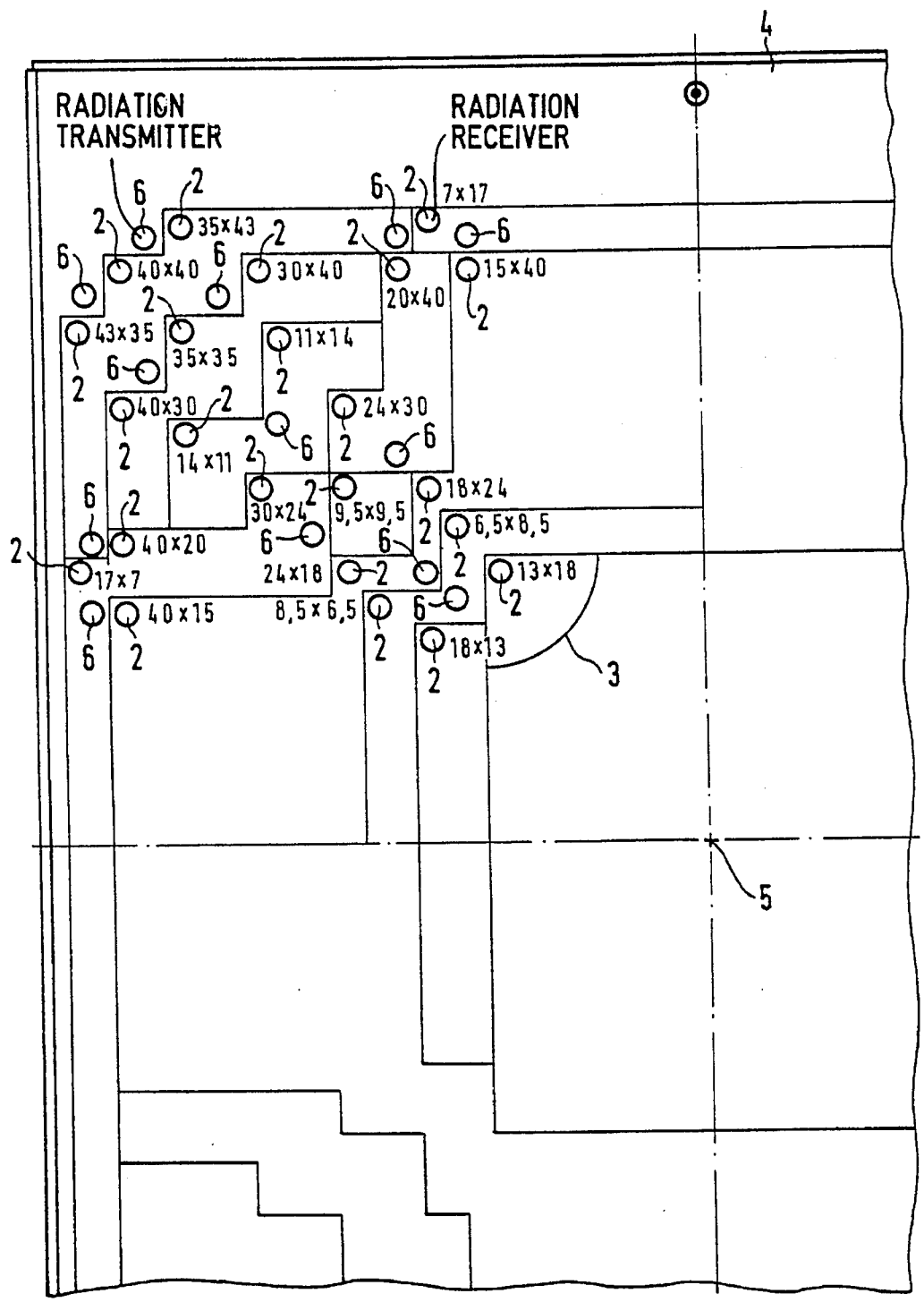
FIG. 2 is a plan view onto the format recognition device according to FIG. 1.

In x-ray diagnostics installations, the film cassettes 1 are arranged by a positioning mechanism on a film cassette carrier 4 such that the center of this film cassette 1 is disposed at a predetermined position 5, this predetermined position 5 coinciding with the central ray of an incident examination radiation beam. Proceeding from this predetermined position 5, the radiation receivers 2 have a spacing dependent on the format of the film cassette 1, as can be seen in FIG. 2.

For detecting the format of the film cassette 1, the radiation receiver 2 can receive ambient light, or light or infrared radiation from at least one radiation transmitter 6. At least one radiation transmitter 6 is preferably respectively allocated to each of the different formats to be detected, and one or more radiation transmitter 2 are in turn allocated to the respective radiation receiver 6 for a given format.

Figure 4:
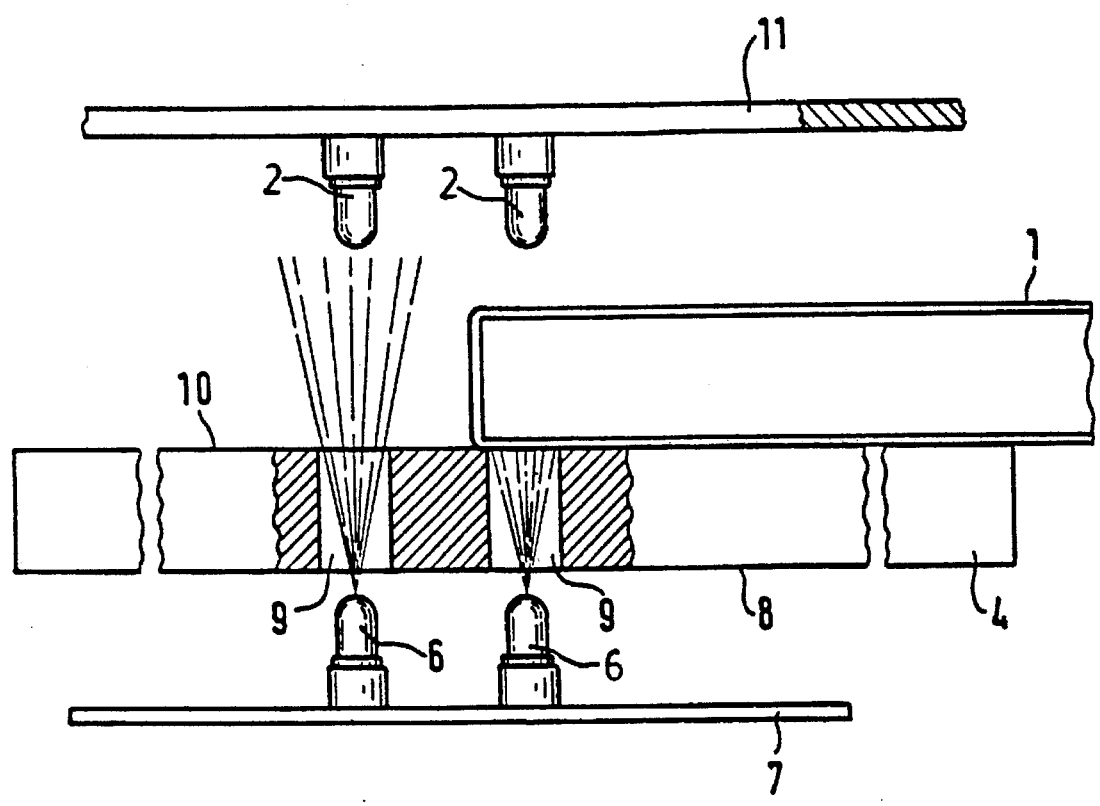
FIG. 4 is a second exemplary embodiment of a format recognition device, shown schematically in a side viewand.

It is within the scope of the invention for the radiation receiver 2 and the radiation transmitter 6 to be arranged lying opposite one another as shown in FIG. 4. In the preferred exemplary embodiment shown in FIG. 1, however, the radiation receiver 2 and the radiation transmitter 6 are arranged neighboring one another on a board 7 that is located in the region of a first side 8 of the film cassette carrier 4. Respective openings 9 in the film cassette carrier 4 are allocated to the radiation receiver 2 and to the radiation transmitter 6, so that the light emanating from the radiation transmitter 6 is directed onto the radiation receiver 2 via a reflector 11 arranged lying opposite the second side 10 of the film cassette carrier 4. For format recognition, the film cassette 1 is then arranged between the second side 10 and the reflector 11, so that it occludes the allocated radiation receiver 2 in the predetermined position 5.

An arrangement wherein the signals of the radiation receivers 2 that are not occluded by the film cassette 1 are evaluated has the equivalent effect.

Figure 3:
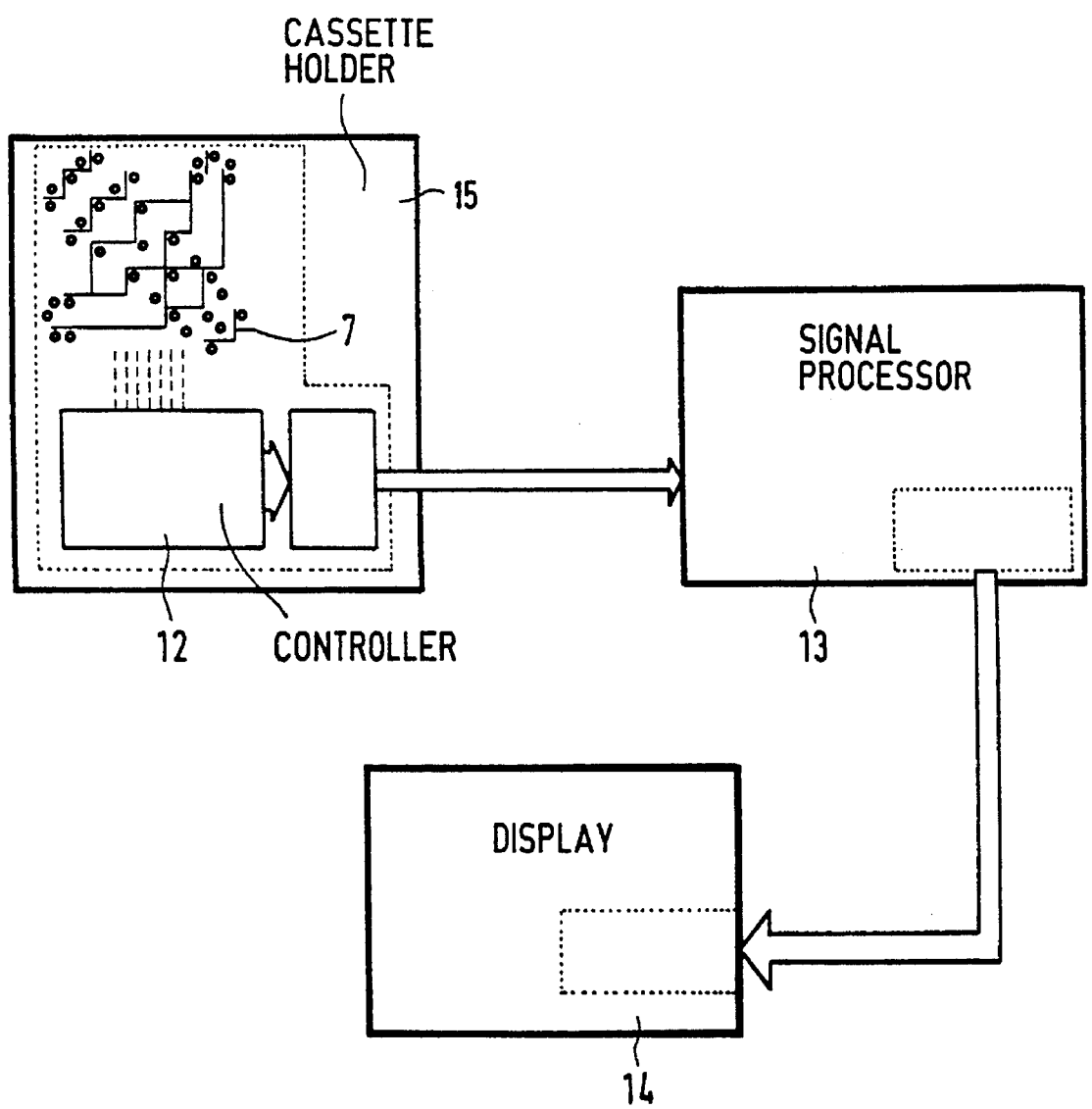
FIG. 3 is a block diagram of a signal processing chain of the format recognition device according to FIGS. 1 and 2.

A schematic arrangement of the format recognition device that includes a controller 12 for driving the radiation transmitter 6 and for evaluating the signals of the radiation receivers 2 is shown in FIG. 3. The controller 12 and the format recognition device are contained in a cassette holder (loader) 15 and the signals of the controller 12 are supplied to a signal processor 13 that generates an output signal on the basis of the received signals dependent on the format of the film cassette 1. This output signal can be supplied to a display 14 for displaying the format.

Although further modifications and changes may be suggested by those skilled in the art, it is the intention of the inventors to embody within the patent warranted hereon all changes and modifications as reasonably and properly come within the scope of their contribution to the art.

We claim as our invention:

1. A device for recognizing a format, among a plurality of different formats, of a film cassette, comprising:

a plurality of groups of multiple radiation receivers, each group disposed at a location at which said radiation incident thereon is altered exclusively by a corner of said film cassette and each group generating a group output signal dependent exclusively on the radiation altered by said corner of said film cassette, each group output signal being uniquely indicative of one of said formats; and means supplied with said group output signal for identifying a format, among said plurality of formats, of the film cassette whose corner altered said radiation incident on said radiation receiver.

2. A device as claimed in claim 1 further comprising a cassette holder in which said film cassette is insertable to a predetermined position, and wherein said plurality of groups of multiple radiation receivers is disposed in said cassette holder at a spacing relative to said predetermined position dependent on the format of the film cassette to be identified.

3. A device as claimed in claim 1 further comprising a radiation transmitter which generates said radiation incident on said plurality of groups of multiple radiation receivers.

4. A device as claimed in claim 3 wherein said plurality of groups of multiple radiation receivers and said radiation transmitter are disposed opposite each another.

5. A device as claimed in claim 3 wherein said plurality of groups of multiple radiation receivers and said radiation transmitter are disposed next to each other, and further comprising a reflector for reflecting said radiation from said radiation transmitter toward said plurality of groups of multiple radiation receivers.

6. A device as claimed in claim 3 wherein said radiation transmitter comprises a radiation transmitter which generates infrared light, and wherein said plurality of groups of multiple radiation receivers comprises receivers for infrared light.

7. A device as claimed in claim 1 further comprising a radiation transmitter which generates said radiation incident on said plurality of groups of multiple radiation receivers, and each group of multiple radiation receivers having two radiation receivers disposed for receiving radiation generated by said radiation transmitter for identifying said format.

8. A device as claimed in claim 1 wherein said means for identifying the format of the film cassette comprises means for identifying the format of the film cassette dependent on occlusion of said radiation incident on one of said plurality of groups of multiple radiation receivers by said corner of said film cassette.

9. A device as claimed in claim 1 wherein said means for identifying the format of the film cassette comprises means for identifying the format of the film cassette dependent on an absence of occlusion of said radiation by said corner of said film cassette.

10. A device as claimed in claim 1 further comprising:

a cassette holder into which said film cassette is insertable;

a radiation transmitter which generates said radiation incident on said plurality of groups of multiple radiation receivers;

a film cassette carrier for inserting said film cassette into said film cassette holder;

a circuit board disposed on one side of said film cassette carrier on which said plurality of groups of multiple radiation receivers and said radiation transmitter are mounted;

said film cassette carrier having an openings therein disposed at respective locations in registry with radiation receivers in one of said plurality of groups of multiple radiation receivers when said film cassette is inserted into said cassette holder, said opening being covered by said corner of said film cassette on a second side of said film cassette carrier; and a reflector disposed in said cassette holder at said second side of said film cassette for reflecting said radiation from said radiation transmitter toward said plurality of groups of multiple radiation receivers.

11. A device as claimed in claim 1 further comprising:

a radiation transmitter which generates said radiation incident on said plurality of groups of multiple radiation receivers;

a controller electrically connected to said plurality of groups of multiple radiation receivers and to said radiation transmitter for driving said radiation transmitter and for receiving the respective group output signals from said plurality of groups of multiple radiation receivers, said controller including said means for identifying the format of the film cassette; and a display connected to said controller which displays an indication of a film format identified by said means for identifying the format of the film cassette.

* * * * *